(12) United States Patent
Yang et al.

(10) Patent No.: US 9,729,545 B2
(45) Date of Patent: Aug. 8, 2017

(54) METHOD AND APPARATUS FOR MANAGING PASSCODE

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 0 days.

(21) Appl. No.: 14/655,322

(22) PCT Filed: Sep. 17, 2013

(86) PCT No.: PCT/KR2013/008425
§ 371 (c)(1),
(2) Date: Jun. 24, 2015

(87) PCT Pub. No.: WO2014/104539
PCT Pub. Date: Jul. 3, 2014

(65) Prior Publication Data
US 2015/0350191 A1    Dec. 3, 2015

(30) Foreign Application Priority Data

Dec. 24, 2012 (KR) .................. 10-2012-0152643
Sep. 16, 2013 (KR) .................. 10-2013-0111245

(51) Int. Cl.
*G06F 7/04* (2006.01)
*H04L 29/06* (2006.01)
(Continued)

(52) U.S. Cl.
CPC .......... *H04L 63/083* (2013.01); *G06F 3/0482* (2013.01); *G06F 3/04842* (2013.01);
(Continued)

(58) Field of Classification Search
CPC .................................. G06F 21/45; H04L 9/08
(Continued)

(56) References Cited

U.S. PATENT DOCUMENTS

2006/0037067 A1*   2/2006   Morris ................. G06Q 20/10
726/7
2009/0036100 A1   2/2009   Lee
(Continued)

FOREIGN PATENT DOCUMENTS

CN        101310283 A     11/2008
JP         H05-135251       6/1993
(Continued)

OTHER PUBLICATIONS

International Search Report for International Application No. PCT/KR2013/008425 dated Nov. 7, 2013, 4 pages, Republic of Korea.
(Continued)

*Primary Examiner* — Anthony Brown
(74) *Attorney, Agent, or Firm* — Thorpe North & Western (57) ABSTRACT

An apparatus for managing a passcode comprises: one or more processors; a memory; and one or more programs stored in the memory and configured to be executed by said one or more processors. The program comprises: a storage module for storing passcode management data; an input window module for displaying the input window on which multiple key buttons are arranged; a combination code generating module for checking the code corresponding to each inputted key button in the code table included in the passcode management data, when the key button is inputted via the input window, and generating a combination code by combining each checked code; and a passcode acquiring module for receiving the passcode with a set storage address from a passcode storage server based on the generated combination code.

14 Claims, 7 Drawing Sheets

(51) Int. Cl.

| | | |
|---|---|---|
| *G06F 3/0484* | (2013.01) | |
| *G06F 3/0482* | (2013.01) | |
| *H04L 9/32* | (2006.01) | |
| *G06F 21/36* | (2013.01) | |
| *G06F 15/16* | (2006.01) | |
| *G06F 21/41* | (2013.01) | |

(52) U.S. Cl.
CPC .............. *G06F 15/16* (2013.01); *G06F 21/36* (2013.01); *G06F 21/41* (2013.01); *H04L 9/3226* (2013.01)

(58) Field of Classification Search
USPC .......................................................... 726/6
See application file for complete search history.

(56) References Cited

U.S. PATENT DOCUMENTS

| | | |
|---|---|---|
| 2010/0011419 A1 | 1/2010 | Seo |
| 2010/0180336 A1 | 7/2010 | Jones et al. |
| 2010/0275257 A1 | 10/2010 | Nishida |

FOREIGN PATENT DOCUMENTS

| | | |
|---|---|---|
| JP | 2008-506198 | 2/2008 |
| JP | 4528866 | 8/2010 |
| JP | 2011-003100 | 1/2011 |
| KR | 2001-0008298 A | 2/2001 |
| KR | 2005-0086106 A | 8/2005 |
| KR | 10-2005-0089944 | 9/2005 |
| KR | 10-2005-0106169 | 11/2005 |
| KR | 10-2008-0012641 | 2/2008 |
| KR | 2008-0036837 A | 4/2008 |
| KR | 10-2009-0013432 | 2/2009 |
| WO | WO 2007/094874 A2 | 8/2007 |
| WO | WO 2008/098710 | 8/2008 |

OTHER PUBLICATIONS

Yuan; Computer Information Retrieval; Apr. 1987; p. 93; Hunan University Press; <Translation of pertinent page>.

* cited by examiner

| % | ※ | ♥ | ☏ |
|---|---|---|---|
| R | ♀ | P | ☆ |
| ◇ | X | ♠ | ■ |
| ☉ | ▽ | ☞ | ♨ |

(a)

| Cxi | K&g | jD0 | @86 |
|---|---|---|---|
| s~b | fF* | t#A | B^4 |
| y.p | M77 | $lz | o8( |
| R,! | sdG | u5E | LWa |

(b)

| G08 | 1*2 | 58a | a83 |
|---|---|---|---|
| 42A | AA9 | 08? | 12* |
| 9zz | Azb | C09 | 3di |
| j8i | i.9 | u8c | L93z |

METHOD AND APPARATUS FOR MANAGING PASSCODE

TECHNICAL FIELD

The present disclosure relates to a passcode management method, and more particularly, to a passcode management method and apparatus for safely protecting personal data of a user.

BACKGROUND ART

As a common method for user authentication, a password authentication method is being used. The password authentication method stores a password initially inputted from a user, compares a user inputted password to the previously stored password whenever needed, and when they are identical, and determines that the password authentication is successful. Also, technology for authenticating a user using a touch pattern set by the user, evolved from a traditional password authentication method, was disclosed. Korean Patent Application Publication No. 10-2009-0013432 discloses a mobile terminal for authenticating a user using a pattern and its locking and unlocking method.

However, a password has various probabilities of leak. For example, a password may be stolen from a third party having peeped a password input process of a user. Also, a password key-entered in a user terminal may be hacked by a hacking program.

Accordingly, there is a need for technology for protecting user data such as a password from hacking more safely.

SUMMARY

The present disclosure is directed to providing a passcode management method and apparatus for safely protecting personal data of a user from shoulder surfing and hacking.

These and other features of the present disclosure may be understood from the following detailed description and will become more fully apparent from the exemplary embodiments of the present disclosure. Also, it will be easily understood that the features of the present disclosure may be realized by the technology described in the appended claims and combinations thereof.

A passcode management apparatus is provided according to a first aspect of the present disclosure including at least one processor, a memory, and at least one a memory stored in the memory and configured to be executed by the at least one processor, the program including a storage module configured to store passcode management data, an input window module configured to display an input window on which a plurality of key buttons is placed, a combination code generation module configured to, when a key button is inputted through the input window, identify codes corresponding to each inputted key button in a code table included in the passcode management data, and to generate a combination code composed of a combination of each of the identified codes, and a passcode acquisition module configured to receive a passcode including a set storage address from a passcode storage server based on the generated combination code.

Preferably, the passcode acquisition module may decrypt the received passcode using the combination code.

More preferably, the passcode acquisition module may receive the passcode corresponding to a hash value of the generated combination code set as a storage address from the passcode storage server.

Also, the passcode management apparatus may further include a table selection module configured to identify a purpose of use of the passcode, and select a code table corresponding to the purpose of use from a plurality of code tables included in the passcode management data.

Preferably, the combination code generation module may identify the codes corresponding to each inputted key button in the selected code table.

The passcode management apparatus may further include a table generation module configured to generate codes corresponding one-to-one to each key button placed on the input window in response to a request for passcode management, generate the code table in which each of the generated codes is recorded, and store the code table in the passcode management data of the storage module.

Preferably, the combination code generation module may further include a storage processing module configured to identify the codes corresponding to each key button inputted through the input window in the generated code table, generate a combination code composed of a combination of each of the identified codes, encrypt the passcode requested for management using the combination code generated by the combination code generation module, set a storage address based on the combination code, store the encrypted passcode in a storage area of the passcode storage server corresponding to the storage address.

Also, the passcode management apparatus may further include a data recovery module configured to request a user data storage server to recover the passcode management data, receive the passcode management data from the user data storage server, and recover the passcode management data to the storage module.

A passcode management method according to a second aspect of the present disclosure, by which a passcode management apparatus manages a passcode, includes displaying an input window on which a plurality of key buttons is placed, identifying, when a key button is inputted from a user on the input window, codes corresponding to each inputted key button in a code table, and generating a combination code composed of a combination of each of the identified codes, and receiving a passcode including a set storage address from a passcode storage server based on the generated combination code.

The present disclosure has an advantage of keeping main data of a user such as login authentication data, settlement means data, an encryption key, and a decryption key safe from hacking.

In particular, the present disclosure has an advantage of ensuring user data protection from hacking by preventing a passcode from being normally identified by data stored in only one of a device and a server.

Further, the present disclosure has an advantage of enhancing security for passcode storage, because the present disclosure generates different combination codes based on the purpose of use of a passcode even though a same key button is inputted, and stores each passcode in separate storage space using the different combination codes.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

DETAILED DESCRIPTION

The foregoing features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Throughout the specification, unless otherwise defined, the term "comprising" as used herein specifies the presence of stated components, but do not preclude the presence or addition of one or more components. Furthermore, it should be understood that the term " . . . unit", "module", or the like as used herein is intended to refer to a processing unit of at least one function or operation, and may be implemented in either hardware, a combination of hardware and software, or software.

Figure 1:
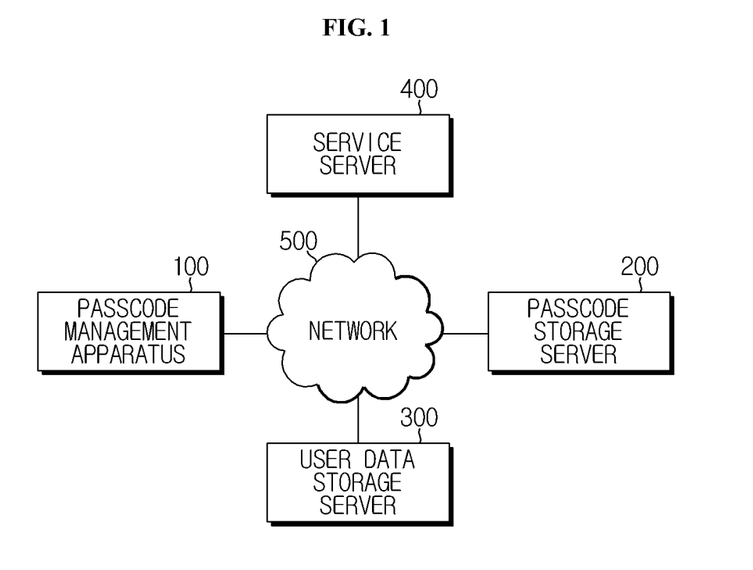
FIG. 1 is a diagram illustrating architecture of a passcode management system according to an exemplary embodiment of the present disclosure.

FIG. 1 is a diagram illustrating architecture of a passcode management system according to an exemplary embodiment of the present disclosure.

As shown in FIG. 1, the passcode management system includes a passcode management apparatus 100, a passcode storage server 200, a user data storage server 300, and a service server 400.

Each of the passcode management apparatus 100, the passcode storage server 200, the user data storage server 300, and the service server 400 communicate with each other via a network 500. Here, the network 500 includes a mobile communication network and a broadband wired communication network, and corresponds to a well-known technology in the present disclosure, and thus, its detailed description is omitted herein The passcode storage server 200 stores at least one encrypted passcode. Preferably, the passcode storage server 200 sets a storage address of each passcode and stores each encrypted passcode in each storage address. Here, the passcode is a combination of at least one symbol (i.e., a number, a character, etc.), and records main data of a user. For example, the passcode records important personal data of a user such as a password, payment settlement means information (e.g., a credit card number), a private key, an encryption key, a decryption key, and an authentication certificate.

Also, when the passcode storage server 200 is requested to store an encrypted passcode from the passcode management apparatus 100, the passcode storage server 200 stores the encrypted passcode in a storage address designated by the passcode management apparatus 100. Further, when the passcode storage server 200 receives a passcode request message including a storage address from the passcode management apparatus 100, the passcode storage server 200 extracts an encrypted passcode stored in the storage address and transmits it to the passcode management apparatus 100.

The user data storage server 300 stores user-dedicated passcode management data. Specifically, the user data storage server 300 stores a code table per purpose of use and passcode management data including a plurality of key buttons for each user. Also, when the user data storage server 300 is requested to recover passcode management data from the passcode management apparatus 100, the user data storage server 300 authenticates a user, and when authentication succeeds, transmits passcode management data of the corresponding user to the passcode management apparatus 100.

The service server 400 is a server which provides a web-based service such as an online banking service, a portal Internet service, and a game service, and when the service server 400 receives authentication information from the passcode management apparatus 100, the service server 400 performs authentication based on the authentication information, and when the authentication succeeds, provides an online service to the passcode management apparatus 100.

The passcode management apparatus 100 manages a passcode of a user. Specifically, after the passcode management apparatus 100 acquires a passcode of a user by linkage with the passcode storage server 200, the passcode management apparatus 100 provides a service requested from the user using the passcode. Also, the passcode management apparatus 100 may recover user-dedicated passcode management data by requesting recovery of passcode management data to the user data storage server 300. The passcode management apparatus 100 includes a desktop computer, a laptop computer, and a mobile communication terminal, and is not limited to a particular type if it is a device which enables communication via the network 500, and preferably the passcode management apparatus 100 is a smart phone.

Figure 2:
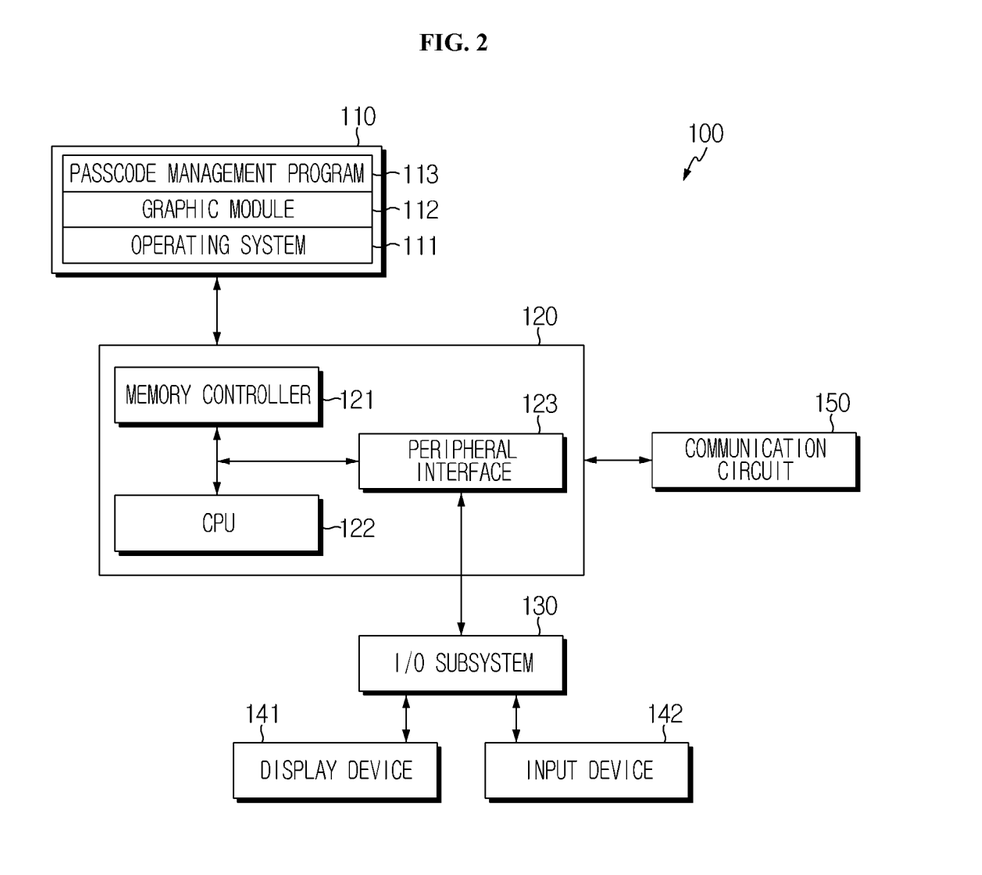
FIG. 2 is a diagram illustrating components of a passcode management apparatus according to an exemplary embodiment of the present disclosure.

FIG. 2 is a diagram illustrating components of a passcode management apparatus according to an exemplary embodiment of the present disclosure.

As shown in FIG. 2, the passcode management apparatus 100 includes a memory 110, a memory controller 121, at least one processor (central processing unit; CPU) 122, a peripheral interface 123, an input/output (I/O) subsystem 130, a display device 141, an input device 142, and a communication circuit 150. These components make communication via at least one communication bus or signal line. The components shown in FIG. 2 include at least one signal processing and/or application specific integrated circuit, and may be implemented in either hardware, a combination of hardware and software, or software.

The memory 110 may include a rapid random access memory, and may include at least one non-volatile memory such as a magnetic disk storage device and a flash memory device, or non-volatile semiconductor memory device. In some embodiments, the memory 110 may further include a storage device located far away from the at least one processor 122, for example, a network attached storage device accessible via the communication circuit 150 and a communication network such as Internet, Intranet, local area network (LAN), wide LAN (WLAN), storage area network (SAN), or combinations thereof. The access to the memory 110 by the component of the passcode management apparatus 100 such as the processor 122 and the peripheral interface 123 may be controlled by the memory controller 121.

The peripheral interface 123 connects an I/O peripheral device of the apparatus to the processor 122 and the memory 110. The at least one processor 122 performs various functions of the passcode management apparatus 100 and data processing by executing various software programs and/or a set of instructions stored in the memory 110.

In some embodiments, the peripheral interface 123, the processor 122, and the memory controller 121 may be implemented on a single chip 120. In other embodiments, they may be implemented as separate chips.

The I/O subsystem 130 provides an interface between the I/O peripheral device of the passcode management apparatus 100 such as the display device 141 and the input device 142 and the peripheral interface 123.

The display device 141 may use liquid crystal display (LCD) technology or light emitting polymer display (LPD) technology, and the display device 141 may be a capacitive, resistive, or infrared touch display. The touch display provides an output interface and an input interface between a device and a user. The touch display displays a visual output to the user. The visual output may include a text, a graphic, a video, and combinations thereof. A part or all of the visual output may correspond to an object of a user interface. The touch display has a formed touch sensing surface to receive a user input.

The input device 142 is an input means such as a keypad, a keyboard, and the like, and receives an input signal from the user.

The processor 122 is a processor designed to perform an operation related to the passcode management apparatus 100 and execute instructions, and for example, the processor 122 may control the reception and manipulation of input and output data between the components of the passcode management apparatus 100 using instructions found from the memory 110.

The communication circuit 150 receives and transmits radio electromagnetic waves through an antenna, or receives and transmits data through a wired cable. The communication circuit 150 converts an electrical signal to electromagnetic waves or vice versa, and through the electromagnetic waves, may communicate with a communication network, a mobile gateway device, and a communication device. The communication circuit 150 may include, for example, an antenna system, a radio frequency (RF) transceiver, at least one amplifier, a tuner, at least one oscillator, a digital signal processor, a CODEC chipset, a subscriber identity module (SIM) card, a memory, and the like, but is not limited thereto, and may include a known circuit to perform these functions. The communication circuit 150 may communicate with other device via a wired network or a wireless network such as Internet called World Wide Web (WWW), Intranet, a network and/or a mobile communication network, wireless LAN and/or metropolitan area network (MAN).

As a software component, an operating system 111, a graphic module (a set of instructions) 112, and a passcode management program (a set of instructions) 113 are mounted (installed) in the memory 110.

The operating system 111 may be an embedded operating system such as, for example, Darwin, RTXC, LINUX, UNIX, OS X, WINDOWS, VxWorks, Tizen, IOS, or Android, and may include various software components and/or devices to control and manage general system tasks (for example, memory management, storage device control, power management, etc.).

The graphic module 112 includes various known software components for providing and displaying graphics to the display device 141. The term "graphics" includes a text, a webpage, a key button, a digital image, a video, an animation, and the like, and is not limited thereto, and includes all objects displayable to a user.

The passcode management program 113 stores a plurality of key buttons which are placed on an input window, and stores a code table per purpose of use including codes corresponding to each key button. Also, the passcode management program 113 generates a combination code based on an inputted key button and a code recorded in the code table, acquires an encrypted passcode stored in the passcode storage server 200 using the combination code, and decrypts the encrypted passcode using the combination code. Also, the passcode management program 113 may perform a recovery procedure for recovering user-dedicated passcode management data.

The passcode management program 113 may be loaded in the memory 110 in case in which a passcode management application is installed.

Figure 3:
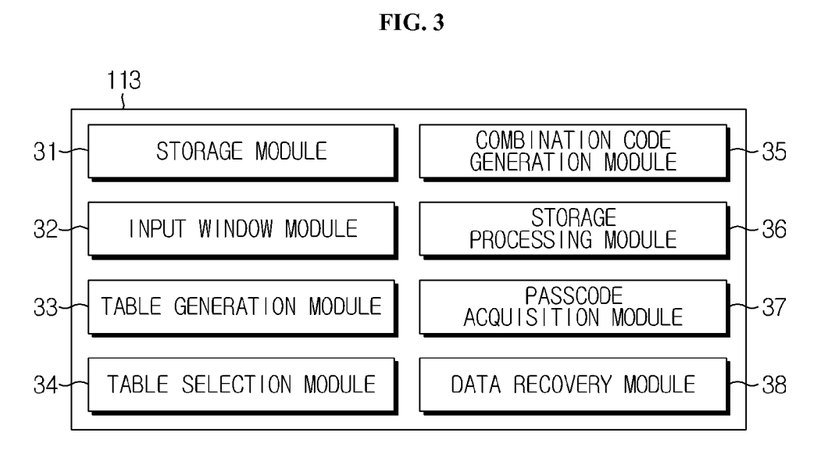
FIG. 3 is a flowchart illustrating configuration of a passcode management program according to an exemplary embodiment of the present disclosure.

FIG. 3 is a flowchart illustrating configuration of a passcode management program according to an exemplary embodiment of the present disclosure.

As shown in FIG. 3, the passcode management program 113 according to an exemplary embodiment of the present disclosure includes a storage module 31, an input window module 32, a table generation module 33, a table selection module 34, a combination code generation module 35, a storage processing module 36, a passcode acquisition module 37, and a data recovery module 38.

The input window module 32 generates an input window on which a plurality of key buttons stored in the storage module 31 is placed and outputs the input window to the display device 141. The key button includes a number button, a character button, and an image button. Preferably, the input window module 32 generates a user-dedicated input window. That is, the input window module 32 generates an input window specific to a user on which a plurality of key buttons is placed, and outputs the input window to the display device 141. Additionally, the input window module 32 may receive a plurality of user-dedicated key buttons from a server (not shown) which supports a passcode management service, and generate an input window on which the plurality of user-dedicated key buttons are placed. Alternatively, the input window module 32 may receive a key button pool including several tens or more key buttons from a server which supports a passcode management service, select a predetermined number of key buttons from the key button pool, and generate an input window on which the selected key buttons are placed. Additionally, if the passcode management apparatus 100 is different, the key buttons on the input window may be different. Preferably, the input window module 32 transmits the plurality of key buttons placed on the input window to the user data storage server 300 together with user identification information, and stores, in the user data storage server 300, the plurality of key buttons on the basis of which the user-dedicated input window is generated.

Figure 4:
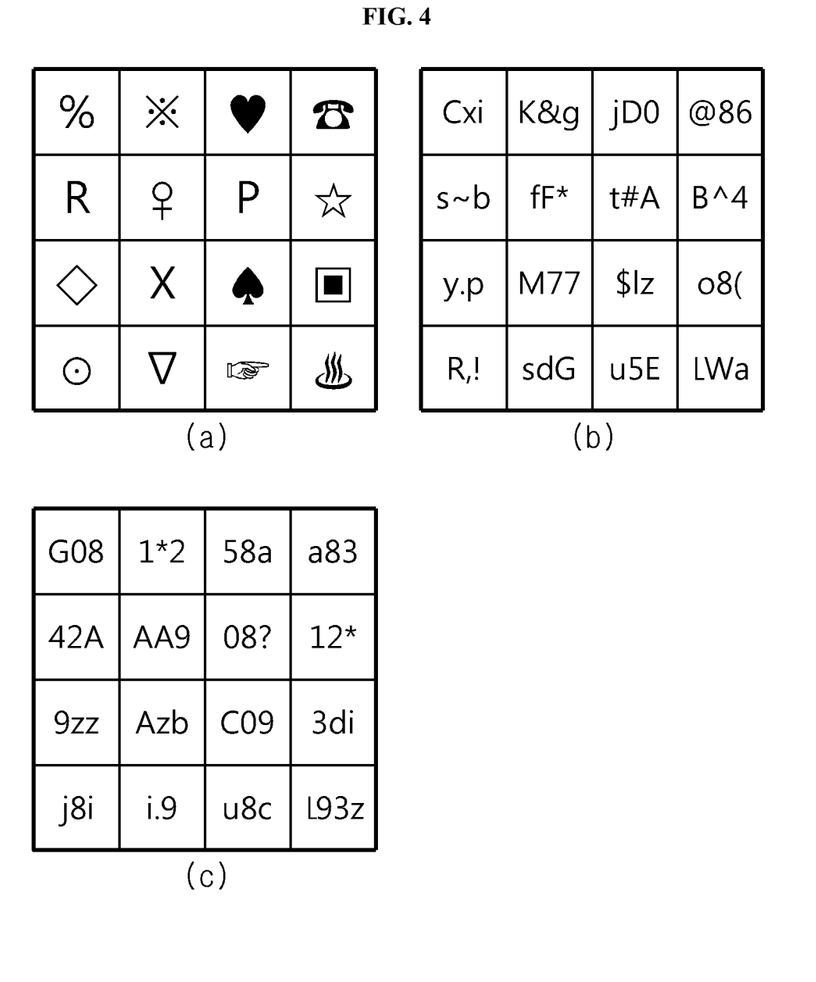
FIG. 4 is a diagram illustrating an input window and a code table according to an exemplary embodiment of the present disclosure.

FIG. 4 is a diagram illustrating an input window and a code table according to an exemplary embodiment of the present disclosure, and referring to FIG. 4, the input window module 32 outputs an input window on which a plurality of key buttons is placed. Although FIG. 4 shows that 16 key buttons of a 4*4 size are placed, the input window module 32 may output input windows of various sizes (for example, 5*5, 5*4, 6*6, etc.) to the display device 141.

The storage module 31 stores user-dedicated passcode management data. Specifically, the storage module 31 stores passcode management data including a code table per purpose of use in which each key button placed on the input window and codes corresponding to each key button are recorded.

The code table records codes corresponding to each key button placed on the input window, i.e., at least one character, number or their combined information, and each code table is classified based on the purpose of use of the passcode. For example, a first code table is used for login authentication of a first site, a second code table is used for authentication certificate signature of a particular bank, and a third code table is used for login authentication of a second site. Additionally, each code table records different codes for the same key button placed on the input window.

Referring to (b) and (c) in FIG. 4, the storage module 31 may store the first code table ((b) in FIG. 4) in which a 'Cxi' code is recorded corresponding to a '%' key button and a 'S~b' code is recorded corresponding to a 'R' key button, and store the second code table ((c) in FIG. 4) in which a 'G08' code is recorded corresponding to a '%' key button and a '42A' code is recorded corresponding to a 'R' key button.

Also, the codes recorded in the code tables are different from each other for each passcode management apparatus 100. That is, the storage module 31 stores a user-dedicated code table per purpose of use, and the code tables stored in each passcode management apparatus 100 differ. Also, the codes recorded in the code tables are irrelevant to personal information of a user, and are generated corresponding to key buttons in a random manner.

When the table generation module 33 is instructed to store a new passcode from a user, the table generation module 33 randomly generates codes corresponding one-to-one to each key button placed on the input window, and generates a code table in which each code is recorded corresponding to each key button. Further, the table generation module 33 stores the generated code table in the storage module 31 together with information associated with the purpose of use of the passcode. Preferably, the table generation module 33 may transmit the newly generated code table together with the user identification information to the user data storage server 300, and synchronize passcode management data stored in the passcode management apparatus 100 with passcode management data stored in the user data storage server 300.

The table selection module 34 performs a function of selecting a code table necessary for passcode acquisition or passcode storage. Specifically, when it is required to acquire a passcode, the table selection module 34 identifies the purpose of use of the passcode, and selects, as a code table for passcode acquisition, a code table corresponding to the identified purpose of use from a plurality of code tables stored in the storage module 31. Also, when the combination code generation module 35 generates a new code table and stores it in the storage module 31, the table selection module 34 selects the stored code table as a code table necessary for passcode storage.

When the input window is outputted, the combination code generation module 35 identifies the codes corresponding to each key button inputted from the input window in the code table selected by the table selection module 34, and generates a combination code containing the identified codes arranged in a key button input order.

The storage processing module 36 performs a function of storing a passcode of a user in the passcode storage server 200. Specifically, the storage processing module 36 sets the combination code generated by the combination code generation module 35 as an encryption key, and performs symmetric key encryption of the passcode requested for management from the user. Further, the storage processing module 36 calculates a hash value of the combination code, transmits a passcode storage request message including the hash value and the encrypted passcode to the passcode storage server 200, and stores the encrypted passcode in a storage area of the passcode storage server 200 corresponding to the hash value set as a storage address. The storage processing module 36 may transmit a passcode storage request message including the combination code and the encrypted passcode to the passcode storage server 200, and store the encrypted passcode in the storage area of the passcode storage server 200 corresponding to the combination code set as a storage address.

The passcode acquisition module 37 performs a function of acquiring a passcode stored in the passcode storage server 200. Specifically, when a particular passcode is needed, the passcode acquisition module 37 instructs the table selection module 34 to select a table to select any one of the plurality of code tables stored in the storage module 31. Further, a combination code is generated in a key button selection order inputted by a user by use of the input window module 32 and the combination code generation module 35, and the passcode acquisition module 37 transmits a passcode request message including a hash value of the combination code to the passcode storage server 200, and receives an encrypted passcode corresponding to the hash value set as a storage address from the passcode storage server 200. The passcode acquisition module 37 may transmit a passcode request message including the combination code to the passcode storage server 200, and receive an encrypted passcode including the combination code as a storage address from the passcode storage server 200. Further, the passcode acquisition module 37 decrypts the encrypted passcode using the combination code as a decryption key. Further, the passcode acquisition module 37 may perform online authentication to the service server 400 using the decrypted passcode.

The data recovery module 38 performs a function of recovering user-dedicated passcode management data. That is, when the data recovery module 38 receives a data recovery command from a user, the data recovery module 38 connects to the user data storage server 300 and performs authentication of the user, and then receives, from the user data storage server 300, passcode management data including a plurality of passcode tables per purpose of use and a plurality of key buttons placed on the input window and stores it in the storage module 31.

Figure 5:
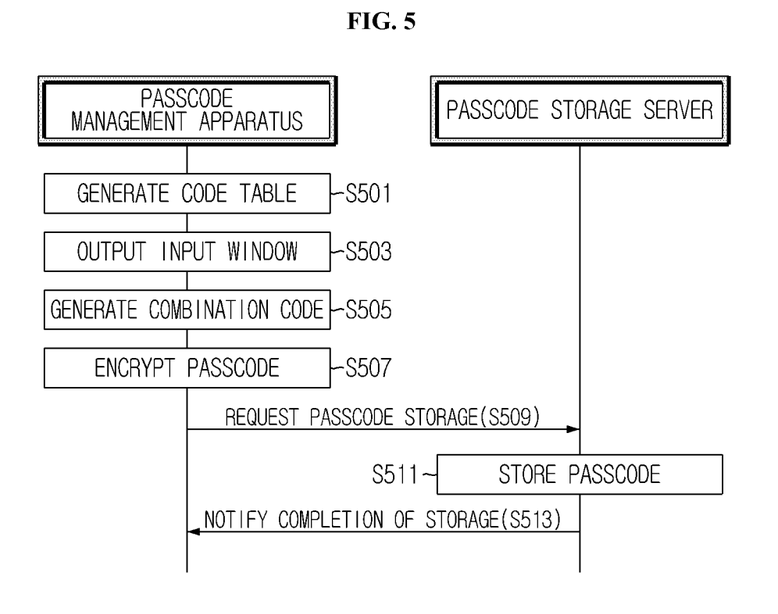
FIG. 5 is a flowchart illustrating a method of storing a passcode in a passcode management apparatus according to an exemplary embodiment of the present disclosure.

FIG. 5 is a flowchart illustrating a method of storing a passcode in a passcode management apparatus according to an exemplary embodiment of the present disclosure.

Referring to FIG. 5, the passcode management apparatus 100 is requested to manage a new passcode from a user. In this instance, the passcode management apparatus 100 may receive, from the user, input of information associated with the purpose for which the new passcode is used (e.g., a password of an authentication certificate, a login password of a particular site, particular data decryption, etc.). Also, the passcode management apparatus 100 may receive, from the user, an input of any one of a login password of a particular site, a private key for electronic signature, payment settlement means information (e.g., a credit card number), a password for an authentication certificate, an encryption key for main data encryption, and a decryption key for data decryption, as a passcode requested to manage.

Then, the table generation module 33 of the passcode management apparatus 100 generates codes corresponding one-to-one to each key button on the input window. Also, the table generation module 33 generates a code table in which each generated code and each key button is recorded corresponding one-to-one to each other and stores the generated code table in passcode management data of the storage module 31 together with the information associated with the purpose of use of the passcode (S501). Preferably, the table generation module 33 may transmit the newly generated code table to the user data storage server 300 together with user identification information, to synchronize passcode management data stored in the passcode management apparatus 100 with passcode management data stored in the user data storage server 300.

Subsequently, when the table generation module 33 generates the new code table and stores it in the storage module 31, the table selection module 34 selects the stored code table as a code table necessary for passcode storage.

Subsequently, the input window module 32 outputs an input window on which a plurality of key buttons is placed to the display device 141, and receives an input of at least one key button from the user (S503). Then, the combination code generation module 35 identifies codes corresponding to each key button inputted on the input window from the selected code table, and generates a combination code containing the identified codes arranged in a key button input order and transmits the combination code to the storage processing module 36 (S505).

Subsequently, the storage processing module 36 sets the combination code as an encryption key and performs symmetric key encryption of the passcode requested for management from the user (S507). Subsequently, the storage processing module 36 calculates a hash value of the combination code, and transmits a passcode storage request message including the hash value and the encrypted passcode to the passcode storage server 200 (S509). Then, the passcode storage server 200 extracts the hash value and the encrypted passcode from the passcode storage request message, sets the hash value as a storage address, and stores the encrypted passcode in the set storage address (S511). Subsequently, when storage of the passcode is normally completed, the passcode storage server 200 transmits a storage complete message to the passcode management apparatus 100 (S513).

Then, the storage processing module 36 of the passcode management apparatus 100 outputs a message notifying that passcode storage was normally completed to the display device 141. Preferably, the storage processing module 36 outputs a message instructing to delete data associated with the passcode of the user to the display device 141, to induce the user to delete personal data such as a private key stored in the passcode management apparatus 100 from the passcode management apparatus 100.

The storage processing module 36 set a storage address of the passcode using the combination code generated by the combination code generation module 35 as it is. In this case, the storage processing module 36 does not calculate a hash value of the combination code, and transmits a passcode storage request message including the combination code and the encrypted passcode to the passcode storage server 200. Then, the passcode storage server 200 sets the combination code as a storage address, and stores the encrypted passcode in the set storage address. As another embodiment, the passcode storage server 200 may directly calculate a hash value of the combination code and store the encrypted passcode in a storage area corresponding to the calculated hash value set as a storage address. In this case, the passcode management apparatus 100 does not calculate a hash value of the combination code, and transmits a passcode storage request message including the combination code and the encrypted passcode to the passcode storage server 200, and the passcode storage server 200 directly calculates a hash value of the combination code and stores the encrypted passcode in a storage area corresponding to the hash value set as a storage address.

In another embodiment, when the user accesses a particular site and signs up, or new authentication data (e.g., a private key, an authentication certificate, etc.) is stored, the passcode management apparatus 100 may automatically start passcode management and perform S501 through S507.

Figure 6:
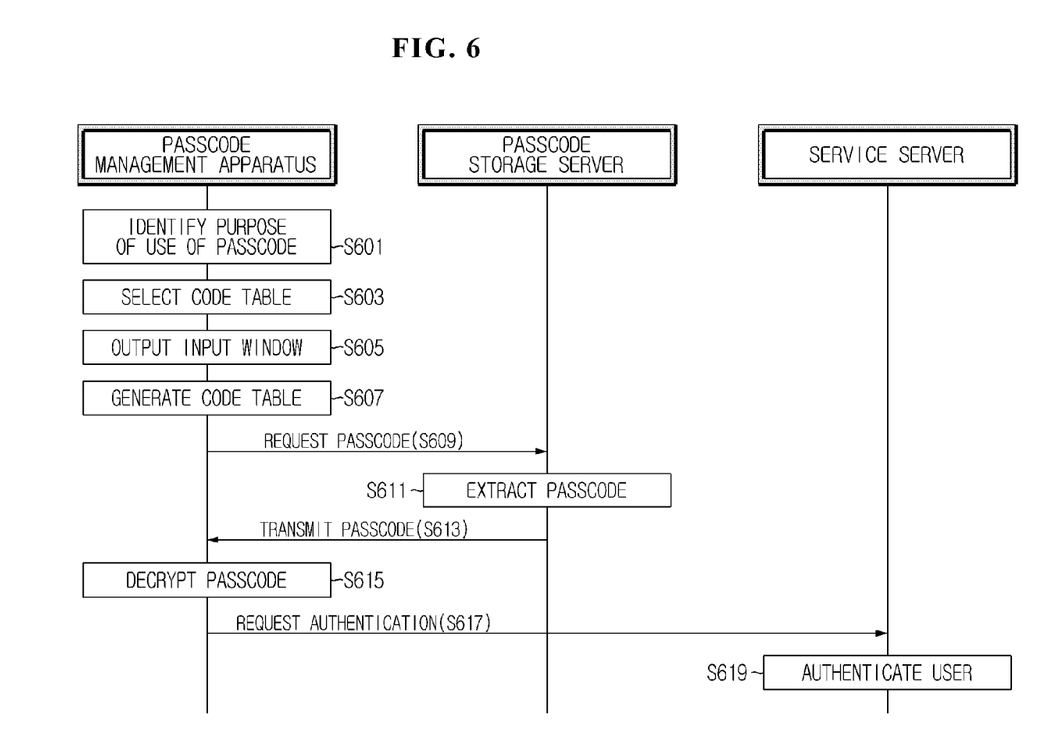
FIG. 6 is a flowchart illustrating a method of acquiring a passcode and performing online authentication in a passcode management apparatus according to an exemplary embodiment of the present disclosure.

FIG. 6 is a flowchart illustrating a method of acquiring a passcode and performing online authentication in a passcode management apparatus according to an exemplary embodiment of the present disclosure.

Referring to FIG. 6, when the passcode acquisition module 37 of the passcode management apparatus 100 is instructed to acquire a particular passcode from a user or senses an online authentication attempt of the user to a particular site, the passcode acquisition module 37 instructs the table selection module 34 to select a table. That is, when it is needed to acquire a particular passcode, the passcode acquisition module 37 instructs the table selection module 34 to select a table.

Then, the table selection module 34 identifies the purpose of use of the passcode necessary for online authentication or the passcode instructed by the user (S601). In this instance, the table selection module 34 may identify the purpose of use of the password based on a site address accessed by the user, and a type of an online service. Also, when the user directly inputs a command to acquire a particular passcode, the table selection module 34 may identify the purpose of use of the passcode by identifying the purpose for which the password is used. Subsequently, the table selection module 34 selects a code table corresponding to the identified purpose of use among a plurality of code tables stored in the storage module 31 as a code table necessary for passcode acquisition and transmits the code table to the passcode acquisition module 37 (S603).

Subsequently, after an input window having a plurality of key buttons placed thereon is outputted to the display device 141 using the input window module 32 (S605), the passcode acquisition module 37 instructs the combination code generation module 35 to generate a combination code. Then, the combination code generation module 35 receives an input of at least one key button set by the user through the input window from the user in a sequential order. Subsequently, the combination code generation module 35 identifies codes corresponding to each of the inputted key buttons in the code table selected by the table selection module 34, and generates a combination code containing the identified codes arranged in a key button input order and transmits the combination code to the passcode acquisition module 37 (S607).

Subsequently, the passcode acquisition module 37 calculates a hash value of the combination code, and transmits a passcode request message including the hash value to the passcode storage server 200 (S609). Then, the passcode storage server 200 determines whether or not a passcode corresponding to the hash value set as a storage address is present, and if present, extracts the encrypted passcode from a storage area corresponding to the hash value set as a storage address, and transmits the encrypted passcode to the passcode management apparatus 100 (S611, S613). In contrast, if not present, the passcode storage server 200 generates an encrypted passcode irrelevant to an arbitrary encrypted passcode, i.e., user data (e.g., authentication data, settlement means data, encryption/decryption keys, etc.) and transmits the encrypted passcode to the passcode management apparatus 100.

Subsequently, the passcode acquisition module 37 receives the encrypted passcode from the passcode storage server 200, and decrypts the encrypted passcode using the combination code generated in S607 (S615). That is, the passcode acquisition module 37 decrypts the encrypted passcode using the combination code as a decryption key. FIG. 6 illustrates that a login password is recorded in the passcode.

Subsequently, the passcode acquisition module 37 transmits an authentication request message including the decrypted passcode to the service server 400 (S617). In this instance, the passcode acquisition module 37 may further include a login ID inputted from the user or included in a storage area such as cookie in the authentication request message.

Then, the service server 400 authenticates if the user is a justified user based on the passcode included in the authentication request message (S619), and selectively provides an online service to the user based on a result of the authentication.

When settlement means information is recorded in the decrypted passcode, the passcode acquisition module 37 accesses a server designated by the user and makes an electronic payment based on the settlement means information. Also, when a private key for electronic signature is recorded in the decrypted passcode, the passcode acquisition module 37 conducts an electronic signature using the private key. Further, when an encryption key or a decryption key is recorded in the decrypted passcode, the passcode acquisition module 37 may encrypt or decrypt data or a file designated by the user using the encryption key or decryption key.

Also, the storage processing module 36 may transmit a passcode request message including the combination code generated in S607 to the passcode storage server 200. In this case, the passcode storage server 200 extracts the encrypted passcode from a storage area corresponding to the combination code set as a storage address and transmits the encrypted passcode to the passcode management apparatus 100. As another embodiment, the passcode storage server 200 may directly calculate a hash value of the combination code, and transmit the encrypted passcode extracted from a storage area corresponding to the hash value set as a storage address to the passcode management apparatus 100.

Figure 7:
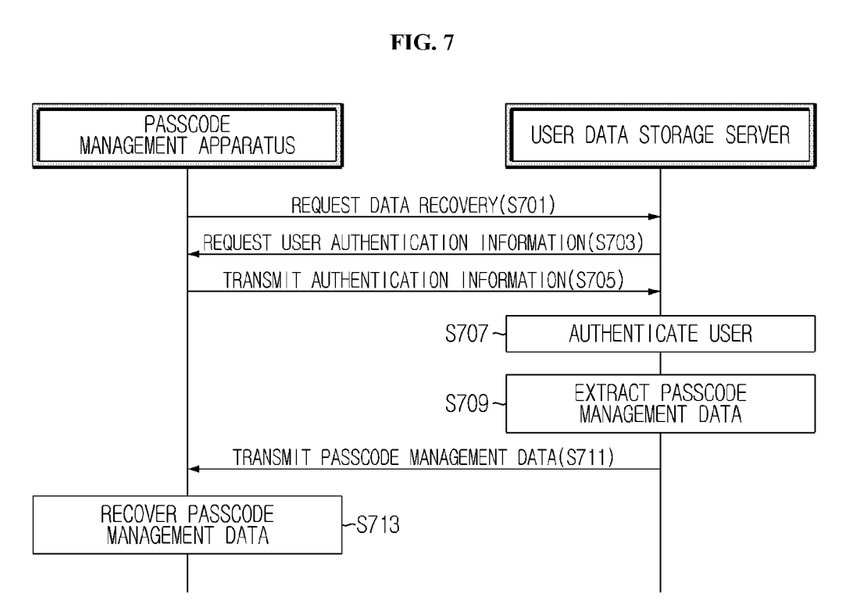
FIG. 7 is a flowchart illustrating a method of recovering passcode management data in a passcode management apparatus according to an exemplary embodiment of the present disclosure.

FIG. 7 is a flowchart illustrating a method of recovering passcode management data in a passcode management apparatus according to an exemplary embodiment of the present disclosure.

Referring to FIG. 7, the passcode management apparatus 100 is requested to recover passcode management data from a user. Then, the data recovery module 38 of the passcode management apparatus 100 transmits a data recovery request message to the user data storage server 300 (S701).

Then, the user data storage server 300 transmits a user authentication information request message to the passcode management apparatus 100 (S703). In this instance, the user data storage server 300 may transmit a web page including identification information of the user (e.g., a resident registration number, IPIN, etc.), a name and a mobile communication telephone number to the passcode management apparatus 100.

Subsequently, the data recovery module 38 receives an input of user authentication information such as the user identification information, the name, and the mobile communication telephone number from the user, and transmits the received user authentication information to the user data storage server 300 (S705).

Then, the user data storage server 300 performs user authentication based on the received user authentication information, and if the authentication succeeds, extracts the user-dedicated passcode management data (S707, S709). Subsequently, the user data storage server 300 transmits the extracted user-dedicated passcode management data to the passcode management apparatus 100 (S711). That is, the user data storage server 300 transmits passcode management data including a plurality of passcode tables per purpose of use and a plurality of key buttons placed on an input window to the passcode management apparatus 100.

Subsequently, the data recovery module 38 of the passcode management apparatus 100 recovers the user-dedicated passcode management data by storing the passcode management data received from the user data storage server 300 in the storage module 31 (S713).

In accordance with the method of FIG. 7, when the user deleted or lost the passcode management data or wants to copy the passcode management data to another device, the user may connect to the user data storage server 300 and perform user authentication, and then recover the user-dedicated passcode management data to a designated device.

As described above, the present disclosure keeps user data safe, for example, authentication data, settlement means data, an encryption key, and a decryption key, and a private key of the user. In particular, the present disclosure keeps personal data of the user safe by generating a combination code based on a key button inputted on an input window of the passcode management apparatus 100, acquiring an encrypted passcode based on the combination code from the passcode storage server 200, and decrypting the encrypted passcode. Further, as it is impossible to normally identify a passcode by only data stored in a device or a server, the present disclosure improves security of personal data. Moreover, because the present disclosure generates different combination codes based on the purpose of use of a passcode even though a same key button is inputted, and stores each passcode in a separate storage space using the different combination codes, the present disclosure enhances security for passcode storage.

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A passcode management apparatus comprising:
   at least one processor;
   a memory; and
   at least one program stored in the memory and configured to be executed by the at least one processor, the program comprising:
   a storage module configured to store different passcode management data for each passcode management apparatus, the passcode management data including a plurality of key buttons and different code tables for each purpose of use of passcode, the code table recording codes corresponding to each key button;
   an input window module configured to display an input window on which a plurality of stored key buttons is placed;
   a combination code generation module configured to, when a key button is inputted through the input window, identify codes corresponding to each inputted key button in a stored code table corresponding to the purpose of use of passcode of each inputted key button, and to generate a combination code composed of a combination of each of the identified codes; and
   a passcode acquisition module configured to request a stored passcode by transmitting the generated combination code to a passcode storage server in which a storage address of the passcode is set based on the combination code, receive the requested passcode from the passcode storage server, and decrypt the received passcode using the combination code as a key.

2. The passcode management apparatus according to claim 1, wherein the passcode acquisition module receives the passcode corresponding to a hash value of the generated combination code set as a storage address from the passcode storage server.

3. The passcode management apparatus according to claim 1, further comprising:
   a table selection module configured to identify a purpose of use of the passcode, and select a code table corresponding to the purpose of use from a plurality of code tables included in the passcode management data,
   wherein the combination code generation module identifies the codes corresponding to each inputted key button in the selected code table.

4. The passcode management apparatus according to claim 1, further comprising:
   a table generation module configured to generate codes corresponding one-to-one to each key button placed on the input window in response to a request for passcode management, generate the code table in which each of the generated codes is recorded, and store the code table in the passcode management data of the storage module.

5. The passcode management apparatus according to claim 4, wherein the combination code generation module further comprises:
   a storage processing module configured to identify the codes corresponding to each key button inputted through the input window in the generated code table, generate a combination code composed of a combination of each of the identified codes, encrypt the passcode requested for management using the combination code generated by the combination code generation module, set a storage address based on the combination code, store the encrypted passcode in a storage area of the passcode storage server corresponding to the storage address.

6. The passcode management apparatus according to claim 1, further comprising:
   a data recovery module configured to request a user data storage server to recover the passcode management data, receive the passcode management data from the user data storage server, and recover the passcode management data to the storage module.

7. A passcode management method by which a passcode management apparatus manages a passcode, the passcode management method comprising:
   storing different passcode management data for each passcode management apparatus, the passcode management data including a plurality of key buttons and different code tables for each purpose of use of passcode, the code table recording codes corresponding to each key button;
   displaying an input window on which a plurality of stored key buttons is placed;
   identifying, when a key button is inputted from a user on the input window, codes corresponding to each inputted key button in the code table corresponding to the purpose of use of passcode of each inputted key button, and generating a combination code composed of a combination of each of the identified codes;
   requesting the passcode by transmitting the generated combination code to a passcode storage server in which a storage address of the passcode is set based on the combination code, receiving the requested passcode from the passcode storage server; and decrypting the received passcode using the generated combination code as a key.

8. The passcode management method according to claim 7, wherein the receiving comprises receiving the passcode corresponding to a hash value of the generated combination code set as a storage address from the passcode storage server.

9. The passcode management method according to claim 7, wherein the generating of a combination code comprises:
   identifying a purpose of use of the passcode, and selecting a code table corresponding to the purpose of use from a plurality of code tables included in passcode management data; and
   identifying the codes corresponding to each inputted key button in the selected code table.

10. The passcode management method according to claim 7, further comprising:
    generating codes corresponding one-to-one to each key button placed on the input window in response to a request for passcode management; and
    generating and storing the code table in which each of the generated codes is recorded.

11. The passcode management method according to claim 10, after the generating and storing the code table, further comprising:
    identifying the codes corresponding to each key button inputted through the input window in the generated code table, and generating a combination code composed of a combination of each of the codes identified;
    encrypting the passcode requested for management using the combination code; and
    setting a storage address based on the combination code, and storing the encrypted passcode in a storage area of the passcode storage server corresponding to the storage address.

12. The passcode management apparatus according to claim 3, further comprising:
    a table generation module configured to generate codes corresponding one-to-one to each key button placed on the input window in response to a request for passcode management, generate the code table in which each of the generated codes is recorded, and store the code table in the passcode management data of the storage module.

13. The passcode management apparatus according to claim 3, further comprising:
    a data recovery module configured to request a user data storage server to recover the passcode management data, receive the passcode management data from the user data storage server, and recover the passcode management data to the storage module.

14. The passcode management method according to claim 9, further comprising:
    generating codes corresponding one-to-one to each key button placed on the input window in response to a request for passcode management; and
    generating and storing the code table in which each of the generated codes is recorded.

* * * * *